(12) United States Patent
Gailberger et al.

(10) Patent No.: US 6,203,736 B1
(45) Date of Patent: Mar. 20, 2001

(54) METHOD FOR PRODUCING PLATELET-SHAPED INTERFERENCE PIGMENTS

(75) Inventors: Michael Gailberger, Neu-Ulm; Katja Strelzyk, Ulm; Karl Holdik, Ulm; Fritz Dannenhauer, Ulm; Erik Grosse, Ulm; Andreas Stohr, Bayreuth, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/131,206

(22) Filed: Aug. 7, 1998

Related U.S. Application Data

(62) Division of application No. 08/858,340, filed on May 19, 1997, now Pat. No. 5,922,465.

(30) Foreign Application Priority Data

May 17, 1996 (DE) .............................................. 196 19 973

(51) Int. Cl.[7] .................................................. B29C 67/00
(52) U.S. Cl. .......................... 264/140; 264/250; 264/255
(58) Field of Search ................................... 264/140, 129, 264/144, 308, 250, 255

(56) References Cited

U.S. PATENT DOCUMENTS

| | | | | |
|---|---|---|---|---|
| 4,390,452 | * | 6/1983 | Stevens | 252/408.1 |
| 5,362,315 | * | 11/1994 | Muller-Rees et al. | 106/493 |
| 5,624,731 | * | 4/1997 | Desjardins | 428/143 |
| 5,733,976 | * | 3/1998 | Dailer | 525/100 |
| 5,888,444 | * | 3/1999 | Dannenhauer et al. | 264/482 |

FOREIGN PATENT DOCUMENTS

| | | |
|---|---|---|
| 44 18 075 | 11/1995 | (DE) . |
| 44 18 076 | 11/1995 | (DE) . |
| 0 383 376 | 8/1990 | (EP) . |
| 0 601 483 | 6/1994 | (EP) . |
| WO 95/32247 * | 11/1995 | (WO) . |

* cited by examiner

Primary Examiner—Jan H. Silbaugh
Assistant Examiner—Edmund M. Lee
(74) Attorney, Agent, or Firm—Evenson, McKeown, Edwards & Lenahan, P.L.L.C.

(57) ABSTRACT

The invention relates to platelet-shaped interference pigments for effect paints for painting objects of daily use, especially vehicle bodies, with the interference pigments including liquid crystal polymers (LCP) with main and/or side groups—mesogens—which are arranged at least approximately chirally-nematically or the like. In order to be able to paint different colored backgrounds in a covering fashion using the transparent interference pigments, the interference pigments are built up in several layers and also have at least one and preferably two interfering layer(s) of liquid crystal polymers and even of a single, preferably centrally located, light-absorbent layer, with the light-absorbent layer absorbing at least a portion of the visible light spectrum. Advantageously the light-absorbent layer can absorb light in the entire visible light spectrum, in other words appear black. It is also possible for it to be made light-absorbent within those partial areas of the visible light spectrum that lie outside one of the colors of the interference pigments. A method is also disclosed for manufacturing the multilayer interference pigments.

12 Claims, 1 Drawing Sheet

METHOD FOR PRODUCING PLATELET-SHAPED INTERFERENCE PIGMENTS

This application is a division of application Ser. No. 08/858,340, filed May 19, 1997.

BACKGROUND OF THE INVENTION

This invention relates to interference pigments, a method for manufacture thereof, effect paint formulated with interference pigments, and paintwork applied therewith.

This application claims the priority of German patent application No. 19619973.5-43, filed May 17, 1996, the disclosure of which is expressly incorporated by reference herein.

In the effort to obtain brilliant or effect-filled color impressions, especially in motor vehicle bodies, so-called effect paints have been developed. EP 383 376 A1 describes such an effect paint in which small mica platelets are coated uniformly on all sides with a cross-linked liquid crystalline polymer (LCP) in a chiral-nematic arrangement of the mesogens. The color appearance of such pigments results from an interference phenomenon. Those light waves in the incident light whose wavelengths interfere with the equidistant lattice plane spacing of the liquid crystalline polymer are reflected from the LCP layer, while light components of other wavelengths pass through the transparent paint body, and are partly reflected from the surface of the mica platelets and partly absorbed. Since light absorption is only slight because of the transparency of the mica platelets, the interferential color effect obtained with this type of interference pigment is determined primarily by the absorption effect of the primer; more detail on this is provided below. In addition, uniform and complete coating of small mica particles with an LCP coating without the pigments clumping in the process is very expensive, making effect paint and therefore effect paintwork on the object in question quite expensive.

For example, the manufacture of interference pigments and liquid crystal polymers is known from EP 601 483 B1 (corresponding to DE 42 40 743 A1), DE 44 18 075 A1, or DE 44 18 076 A1, these polymers creating a more intensive interferential color effect and also being easier to manufacture. These interference pigments consist as a whole of small pieces of a thin, crosslinked, colorless, clear transparent film of liquid crystalline polymers. The color effect that can be achieved with them is based on the regular structure and uniform arrangement of the molecules in the shape of a liquid crystal and on the resultant interference with a certain portion of the light spectrum in which the pigment produces a reflecting effect. The other light components pass through the pigment. As a result, striking color effects of different kinds can be produced, depending on the structure of the paintwork and/or the interference pigments and their mixtures. The basic shade of the interference pigments is determined by the color impression, or the color that is seen when the painted surface is illuminated perpendicularly and viewed perpendicularly. When the beam path is directed at an angle to the surface, the lattice plane intervals, due to the geometry, appear to be changed relative to the orthogonal beam direction, so that the color impression shifts toward another color that is offset toward shorter wavelengths in the color spectrum, and this depends on the relative viewing direction of the surface. Depending on the position of a certain part of the surface relative to the line of sight of the viewer, the surface portion appears in the basic color or in the other color with the shorter wavelength. For example, interference pigments with a basic red color can change to green; a color change between green and blue can be produced using different interference pigments.

The intensity of the colors that can thus be perceived increases with the darkness of the background color on which the paint layer that determines the color rests, with the color of the background however having to be determined by color pigments that have an absorptive effect. This is due to the fact that the light components that pass through the interference pigments are absorbed more or less completely by the dark background to a degree that increases with the darkness of the background.

The interference pigments of the type under discussion here are obtained by the polymers being spread in the liquid or liquid crystalline state onto a smooth substrate, a polished roller for example, forming a thin film. The spreading process produces an alignment of the molecules within the film, namely a homogeneous orientation; it is only because of this alignment that the color exhibits an interference color. During the shearing of the liquid crystalline polymers, equidistant lattice planes automatically form during spreading and thus create color selective deflecting structures.

Known interference pigments, as we have said, are clear and transparent and therefore do. not have any covering power. They therefore require a uniformly colored background in order to produce a uniform color impression. On the other hand, the color of the background can change within a wide range of workpieces, for example when filler paint from different manufacturers is used, with said paints differing in color, or when differently primed structural or body parts are processed on one and the same workpiece. Prior to the application of an interference effect paint that has no covering power, therefore, assurance must be provided that not only all of the parts of the workpiece but also all of the workpieces within a series are painted uniformly with only one primer whose color is specified, necessitating an additional painting and baking process. In the case of repairs as well, the body part whose paint is to be repaired or even the entire body must first be primed uniformly and in exactly the same color as originally and this primer must then be baked. Only then can the effect paint be applied to the repair. This is costly and awkward for routine applications but especially for repairs. Theoretically, it would be possible when formulating an effect paint to mix absorption pigments into the paint along with interference pigments in order to make the paint exhibit covering power as a result. However, to achieve a good covering power, such a large amount of absorption pigment would have to be added to the paint that the effect of the interference pigments would be very sharply attenuated as a result because they are dependent on good transparency of the body of the paint. If only a small amount of absorption pigments is mixed in with the paint and adversely affects the interferential color effect of the interference. pigments only. slightly,. the paint, in order to achieve a sufficient covering power, would have to be applied in a layer that was so thick that it could not be applied in a single step. Such a paint would have to be applied in a minimum of two steps, which would offer no advantages over a previous application of a primer with good covering power.

SUMMARY OF THE INVENTION

The primary object of the present invention is to improve interference pigments in such fashion that they can be manufactured in simple fashion and have a powerful effect in terms of their interferential color phenomena, yet can be formulated with a paint that likewise has good covering power.

This object is achieved according to the invention with respect to the pigments by providing platelet-shaped, multilayered interference pigments for effect paint for painting objects of daily use, especially vehicle bodies, with at least one layer of interference pigments comprising liquid-crystal polymers (LCP) whose mesogens are arranged at least approximately chirally-nematically and/or smectically and/or cholesterically; with a light-absorbent layer also being provided in the interference pigments, with the layer absorbing at least a part of the visible light spectrum; and with the edges of the platelet-shaped interference pigments being made in the form of circumferentially uncoated fractured edges of multilayer sandwich.

With respect to the manufacturing process the object is achieved in two ways, namely by applying liquid crystalline polymers (LCP) in the liquid state as a thin film to a smooth substrate and as a result arranging the mesogens are at least approximately chirally-nematically and/or smectically and/or cholesterically, curing this film and processing the cured film into pigments. Following curing of a first film, the latter is initially left on the smooth substrate and a layer of a light absorbent dye is applied to this film in a layer thickness that produces absorption and is then cured. only then is this two-layer cured film pulled off the substrate and fractured into platelet-shaped particles.

Alternatively, a film with a light-absorbent dye is applied as a substrate in a layer thickness that produces absorption, onto which film the film made of liquid crystal polymers (LCP) is applied and cured in the liquid state, then this sandwich composed of the absorption film and cured LCP film is fractured into platelet-shaped particles.

By the application of a film of liquid crystal polymers on a smooth, geometrically defined substrate, a preproduct for interference pigments can be produced in an economical fashion that produces a good interferential color effect. According to this method, a multilayer sandwich with a light-absorbing covering or intermediate layer can be produced on or in the film of pigment preproduct that lends the film, or the interference pigments produced therefrom, the desired covering power. Absorption pigments, in order to achieve a covering effect, do not have to be mixed with an effect paint that is formulated with the interference pigments according to the invention. On the other hand, the paint or color designer is of course free to add absorption pigments of certain colors to an effect paint to achieve further desired color effects. When, during application, a mechanically supported shearing effect is exerted on the applied liquid crystalline polymers, for example by spreading, because of the rapid and especially good alignment and uniform arrangement of the mesogens in the film, a very good interferential color effect is achieved.

It is to be understood that the word "paint" as used herein includes lacquer and any other covering composition which would or could be used for the same purpose.

Other objects, advantages and novel features of the present invention will become apparent from the following detailed description of the invention when considered in conjunction with the accompanying drawings.

Figure 1:
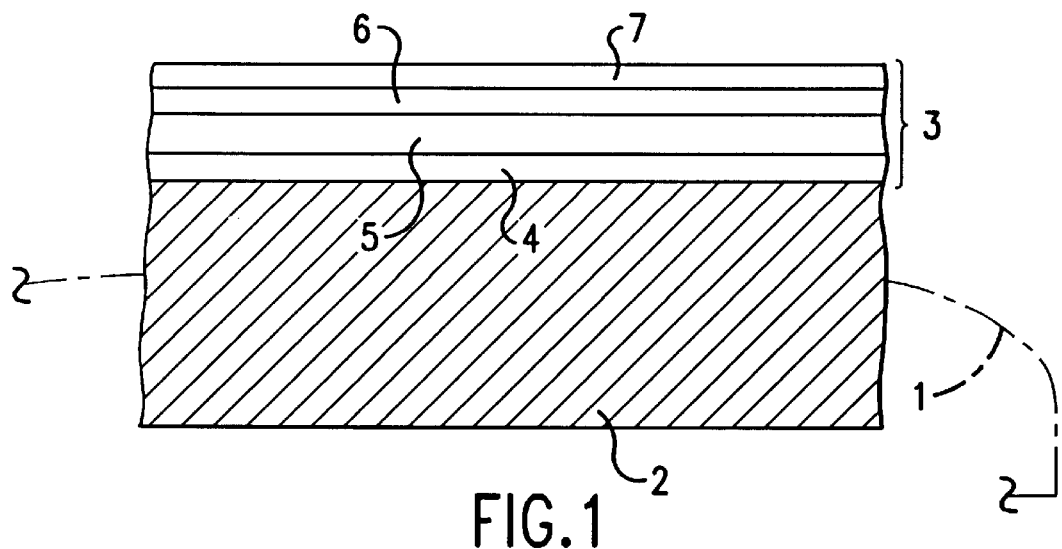
FIG. 1 is a schematic diagram of a body part with a cross section, enlarged in portions, through the wall of the part and the paint.

Attention is directed to FIG. 1 which shows a body part 1 schematically represented by a dot-dash line and in portions thereof, an enlarged cross section through sheet metal 2 and multilayer paintwork 3, with the paintwork shown as an example consisting of a primer 4, filler paintwork 5, effect paintwork 6, and a clear paint layer 7.

Platelet-shaped interference pigments 8 applied in three layers (FIG. 2) or two-layer interference pigments 9 (FIG. 3) are embedded in the color-determining paintwork layer of effect paint 6. Regardless of the number of layers of interference pigments, there is at least one layer 14 composed of liquid crystalline polymers (LCP) with main and/or side group mesogens that are arranged at least approximately chirally-nematically and/or smectically and/or choleristically. For example, regular helices 10 are formed in the liquid crystalline polymers which, because of their regular structure, correspond to a size of a picture element in the vicinity of the light wave length of a certain color of visible light and as a result produce the interferential color effect, with the color also depending on the viewing angle. The platelet-shaped interference pigments have a thickness (S) of about 30 to 50 $\mu$m and a diameter (L) of 5 to 100 $\mu$m, preferably 10 to 50 $\mu$m.

In order for interference pigments 8 or 9 to be simple to manufacture and to be highly effective in terms of their interferential color phenomena, yet capable of being formulated with paint with equally good covering power, a light absorbent layer 11 is incorporated into the interference pigments that absorbs at least a part of the visible light spectrum. The edges of the platelet-shaped interference pigments are made as circumferentially uncoated fractured edges 12 of multilayer 13 or 13'.

Figure 2:
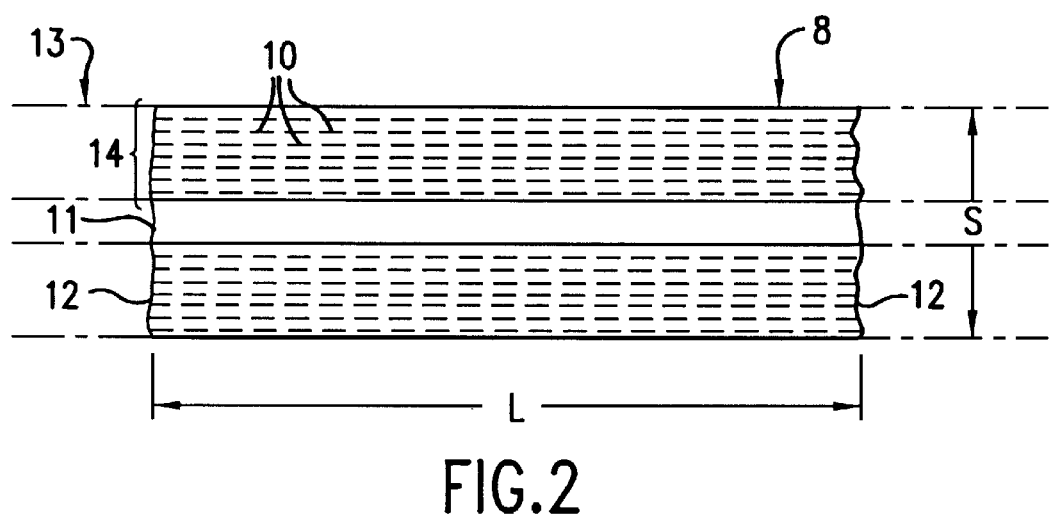
FIG. 2 is a representation of a three-layer interference pigment.
Figure 3:
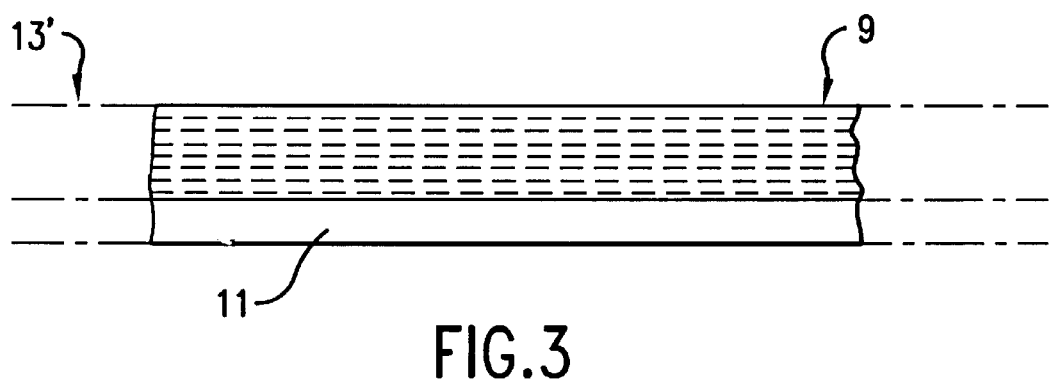
FIG. 3 is a representation of a two-layer interference pigment.

The three-layer interference pigments 8, preferably structured symmetrically with respect to the middle layer according to FIG. 2, with light absorbent layer 11 located centrally in sandwich 13, do have a greater manufacturing cost than two-layer interference pigments 9 according to FIG. 3, but the three-layer pigments have the advantage of producing their interferential color effects on both the top and bottom, in other words in the two possible relative positions within the paint layer, while the interference pigments that consist of two layers and are easier to produce exhibit this effect on only one side. According to probability, about 50% of the interference pigment 9 embedded in paint layer 6 has the interferentially effective LCP side outward while the other half has the absorption side 11 outward. This produces a less brilliant color phenomenon of the effect color by comparison with the use of three-layer interference pigments.

In general, a substance is chosen for light absorbent layer 11 that has a light absorbing effect throughout the entire visible light spectrum, in other words it appears black. As a result, the respective effect colors, regardless of which they are, appear clearly. It is also possible to use instead a substance for light-absorbent layer 11 that is light-absorbent only within a narrow partial area of the visible light spectrum, which for example coincides with one of the two effect colors of the interference pigments, for example red or green. Then one to of the matching effect colors appears particularly intensively while the other of the two effect colors appears as a mixed color. In addition, a substance that absorbs light in a narrow band and does not correspond to any of the effect colors can be used for layer 11; this then produces mixed colors in both effect colors that slightly smooth the color switch between the two interferential effect colors, which may be desirable in individual cases.

In order to produce the platelet-shaped interference pigments according to the invention in a three-layer form, the procedure is as follows: liquid crystalline main or side chain polymers or mixtures thereof are used as the liquid crystalline polymers (LCP), as well as liquid crystalline oligomers or oligomer mixtures or liquid crystalline monomers or monomer mixtures. These LCPs are applied in the liquid state to a smooth substrate, for example a glass plate, a polished steel cylinder, a shiny smooth film of a plastic that has an anti adhesive effect with respect to the LCPs to be applied, or to a polished metal strip, as a thin film with a thickness of about 3 to 15 $\mu$m, with the mesogens of the LCPs being arranged automatically at least approximately chirally-nematically and/or smectically and/or cholesterically. The application of the film to the substrate can be performed by spreading, rolling, or spraying. A shearing process during the application of the film to the substrate favors a chiral-nematic or similar alignment of the mesogens in the film-forming polymer. The thin film thus produced is cured on the substrate. After the first film has been cured it is initially left on the smooth substrate and a layer 11 of a light-absorbing dye is applied to this film in a layer thickness that produces a certain absorption effect; this layer is then cured as well. After the light-absorbent layer has cured, the two-layer sandwich is initially left on the smooth substrate and an additional film is applied and cured whose composition and layer thickness correspond to the first film. Only then is this three-layer cured sandwich removed from the substrate and fractured up into particles in the shape of platelets, with lateral uncoated edges 12 resulting. After multilayer film 13 has been fractured up, the particles whose diameters (L) are less than the film thickness (S) and the particles whose diameters (L) are more than ten times greater than film thickness (S) are sorted by a grain size selective separating method and the remaining particles are used as interference pigments 8. The selected grain size spectrum of the interference pigments is limited at the bottom end because pigments of any size do not automatically assume the surface-parallel orientation during paint application that is important for the direction-dependent color effect. The presence of a great many small pigments would also produce a certain dispersion effect that would have an adverse effect on the color brilliance of the interferentially produced colors. The pigments must also not be too large since otherwise they would cause problems in the equipment used for paint application and because overly large pigments might also possibly project out of the paint surface and have an adverse effect on a smooth appearance of the paint surface. The film fragments that are too large and are sorted out can be collected separately from the chosen film dust and returned to the comminution process.

An alternative method for producing two- or three-layer interference pigments consists in introducing the absorption layer as a prefabricated film-type layer into the manufacturing process, applying to it and then curing on top of it, on one or both sides, the layers that have the interferential effect In the case of bilateral coating of this absorption film, the outer coatings are time-staggered and applied one after the other and cured with the sandwich possibly being used after the application and curing of the first LCP layer so that the side of the sandwich that was formerly on the bottom becomes the one on top.

It is recommended to choose liquid crystalline polymers for layers 14 that have an interferential effect from photocrosslinkable or electron-beam-crosslinkable polymers. Because of the lack of a requirement for thermal crosslinking of the LCPs on the interference pigments, a situation can be created such that the color effect of the interference pigments does not change in an undesirable fashion as the result of a later baking of paintwork produced with such an effect paint. Although in individual cases there may be LCPs that can withstand such a baking process with a negligibly slight color change, or there may also be applications in which this color change can be controlled, precipitates out when processed and as a result can be kept in the interference pigment so that thermally crosslinkable LCPs can also be allowed for the interference pigments. Usually however one will not prefer thermally crosslinking LCPs. Electron-beam-crosslinkable polymers are also of interest because they are not dependent on the presence of costly photoinitiators.

As for the optical and geometric quality of absorption layer 11, it incorporates certain design possibilities that will now be mentioned. We have already referred to the absorption effect for the entire spectrum of visible light, in other words a black absorption layer, and a spectrally-limited absorption effect that appears for a certain color of the light spectrum, with this color advantageously coinciding with one of the two effect colors. An additional color-designing possibility lies in a deliberate choice of the layer thickness of absorption layer 11 so that the degree of absorption is determined by the thickness of layer 11. For example there are transparent coatings or films dyed with certain colors which, depending on the layer thickness and/or the degree of coloration, have a more or less pronounced light absorbent effect. Accordingly, by choosing the thickness of layer 11 or by choosing a degree of coloration of this material, the degree of absorption can be determined. This means that the covering power of the interference pigments can be adjusted from completely covering to semitransparent. This possibility applies to all ranges of the spectrum, in other words for black as well as colored absorption layers. When the light absorbent layer 11 is light absorbent in the entire visible light spectrum, it is black.

For the sake of simplicity it should be also mentioned that absorption layer 11 can be an evaporated or sputtered metal coating that has a definite absorption effect in the case of very limited layer thicknesses.

The interference pigments made of several layers and produced in this fashion can be mixed into a paint for painting articles of daily use, especially vehicle bodies. Such paints are applied to an object of daily use, especially a vehicle body or a part of the body in the color-determining cover layer 6 of paintwork 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for producing platlet-shaped interference pigments comprising applying liquid crystalline polymers in a liquid state as a first thin film to a smooth substrate to thereby arrange its mesogens at least approximately chirally-nematically, smecterically, cholesterically, or combinations thereof, and curing the film, leaving said film on the smooth substrate and applying a layer of a light absorbent dye to the film in a layer thickness that produces light absorption and then curing said film with the light absorbent layer thereon thereby resulting in a two-layer cured film, pulling the resulting two-layer cured film off the substrate, and fracturing the two-layer film into platelet-shaped particles, the particles having lateral uncoated edges.

2. A method according to claim 1, further comprising leaving the two-layer cured film after curing of the light absorbent layer on the smooth substrate, applying another film, curing said other film, said other film corresponding at least approximately in terms of its composition and layer thickness to the first film thereby resulting in a three-layer cured film, pulling the resulting three-layer cured film off the substrate, and fracturing said three-layer film into platelet-shaped particles.

3. A method for making platelet-shaped interference pigments comprising applying liquid crystal polymers (LCP) in a liquid state as a first thin film to a substrate to thereby arrange its mesogens at least approximately chirally-nematically, smectically, cholesterically, or combinations thereof, and curing the film, said substrate comprising a film with a light-absorbent dye in a layer thickness that produces light absorption, curing said film of liquid crystal polymers in the liquid state thereby resulting in a sandwich, and fracturing the resultant sandwich of the absorption film and cured LCP film into platelet-shaped particles, the particles having lateral uncoated edges.

4. A method according to claim 3, wherein said absorption film comprises one side on which said first LCP thin film is applied and another side opposite said one side, further comprising, following curing of said first LCP thin film applying a second LCP layer to the side of the absorption film opposite the first LCP thin film, curing the second LCP layer, and fracturing the resulting three-layer cured film into platelet-shaped particles.

5. A method according to claim 1, further comprising sorting out the particles that are smaller in diameter than film thickness (S) and those that are more than ten times larger in diameter than film thickness (S) by grain size, the particles which are not sorted out then remaining, and using the remaining particles as interference pigments.

6. A method according to claim 3, further comprising sorting out the particles that are smaller in diameter than film thickness (S) and those that are more than ten times larger in diameter than film thickness (S) by grain size, the particles which are not sorted out then remaining, and using the remaining particles as interference pigments.

7. A method according to claim 1, wherein the film made of the liquid crystalline polymers is applied in a thickness of approximately 3 to 15 μm.

8. A method according to claim 3, wherein the film made of the liquid crystal polymers is applied in a thickness of approximately 3 to 15 μm.

9. A method for making platelet-shaped interference pigments comprising applying liquid crystal polymers (LCP) in a liquid state as a first thin film to a substrate to thereby arrange its mesogens at least approximately chirally-nematically, smectically, cholesterically, or combinations thereof, and curing the film, said substrate comprising a film with a light-absorbent dye in a layer thickness that produces light absorption, curing said film of liquid crystal polymers in the liquid state thereby resulting in a sandwich, and fracturing the resultant sandwich of the absorption film and cured LCP film into platelet-shaped particles, thereby resulting in platelet-shaped interference pigments having edges in the form of circumferentially uncoated fractured edges of said sandwich.

10. A method according to claim 9, wherein said absorption film comprises one side on which said first LCP thin film is applied and another side opposite said one side, further comprising, following curing of said first LCP thin film applying a second LCP layer to the side of the absorption film opposite the first LCP thin film, curing the second LCP layer, and fracturing the resulting three-layer cured film into platelet-shaped particles.

11. A method according to claim 9, further comprising sorting out the particles that are smaller in diameter than film thickness (S) and those that are more than ten times larger in diameter than film thickness (S) by grain size, the particles which are not sorted out then remaining, and using the remaining particles as interference pigments.

12. A method according to claim 9, wherein the film made of the liquid crystal polymers is applied in a thickness of approximately 3 to 15 μm.

* * * * *